Nov. 28, 1967  A. H. FISKE  3,354,721
PRESSURE GAGING SYSTEMS OF APPARATUS
Filed Oct. 23, 1965  3 Sheets-Sheet 2
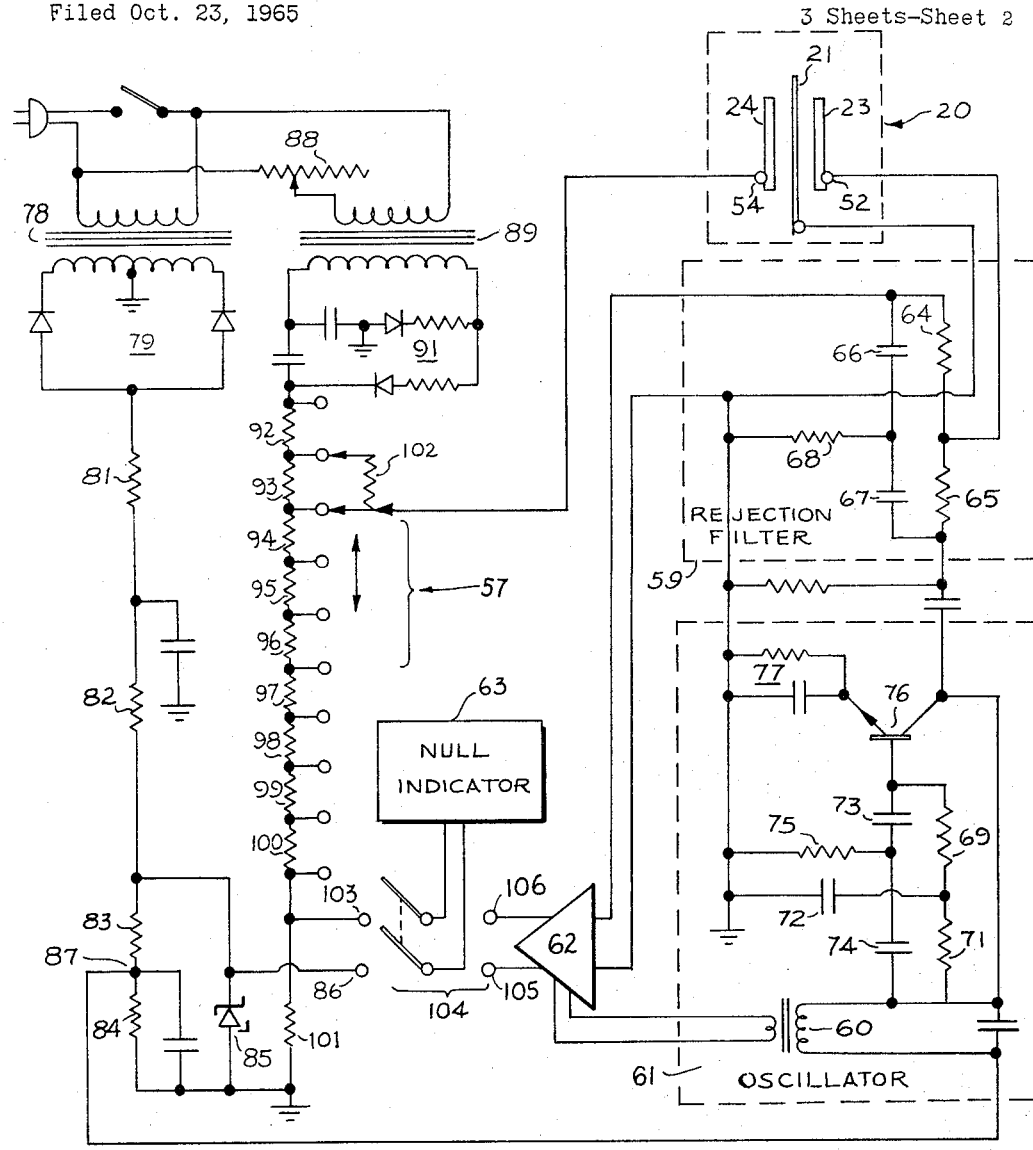
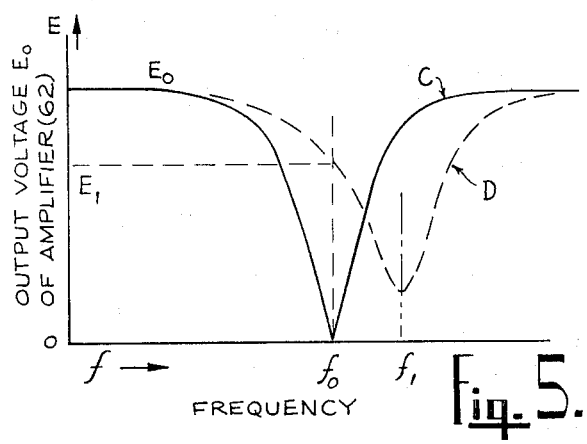
Fig. 4.
Fig. 5.
INVENTOR.
AUGUSTUS H. FISKE
BY
Robert H. Ware
ATTORNEY Nov. 28, 1967  A. H. FISKE  3,354,721

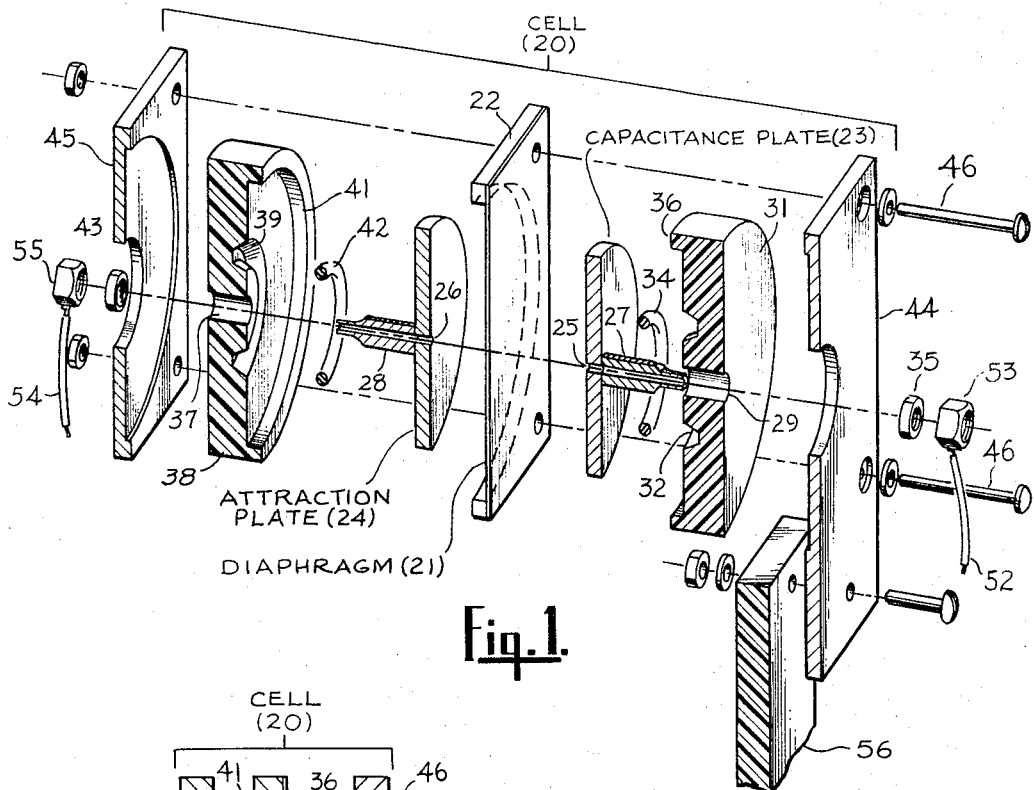
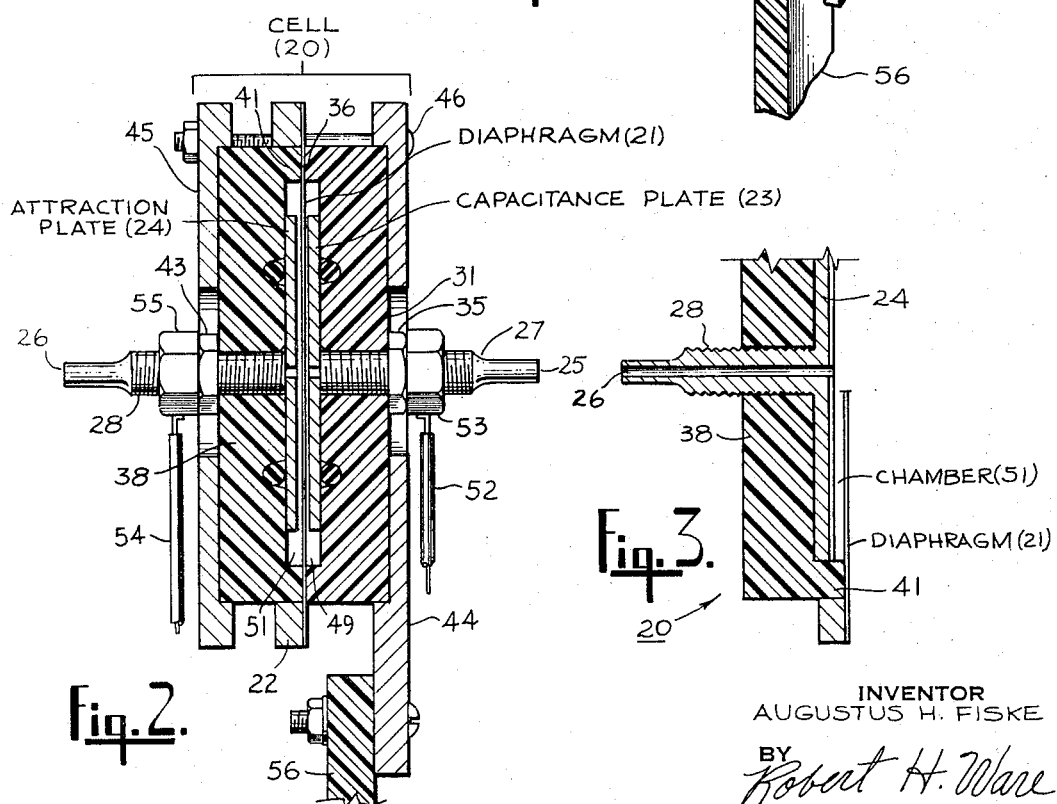

PRESSURE GAGING SYSTEMS OF APPARATUS

Filed Oct. 23, 1965  3 Sheets-Sheet 3

INVENTOR
AUGUSTUS H. FISKE

BY
*Robert H. Ware*
ATTORNEY 3,354,721
PRESSURE GAGING SYSTEMS OF APPARATUS
Augustus H. Fiske, 264 Greenwood Ave.,
West Redding, Conn. 06875
Filed Oct. 23, 1965, Ser. No. 503,331
10 Claims. (Cl. 73—398)

This invention relates to high precision gages for measuring pressures and particularly to pressure gages for measuring extremely low pressure differentials, partial pressures and the like.

Conventional pressure measuring devices are generally dependent upon expansible, bellows-type volumetric chambers connected to movable indicating devices, bellows-pointers, or similar mechanical read-out members. In addition, conventional pressure gages are highly sensitive to ambient temperature variations, which seriously reduce the accuracy of their pressure indications.

In the systems of the present invention, high precision measurements of extremely low pressures and pressure differentials are achieved. The pressure-sensing component is a thin, flexible diaphragm whose opposite faces are exposed to sample and reference chambers. Deflection of this diaphragm by a pressure differential produces a corresponding change in the electrical capacitance between the diaphragm and a passive capacitance plate. Ambient temperature variations are automatically compensated to eliminate their effect upon the pressure indications. The present invention thus provides a highly effective pressure indicating system of greatly reduced size and cost, which is easily portable and which may be used with any AC line voltage.

Accordingly, a principal object of the present invention is to provide a high precision system for the measurement of extremely low pressures and pressure differentials which is not appreciably sensitive to ambient temperature variations.

Another object is to provide a pressure-comparison cell having two volumetric chambers separated by a flexible membrane or diaphragm whose deflection in response to pressure differentials between the two chambers provides automatic read-out indications of the pressure differential, eliminating the need for mechanical indicators, bellows or external indicating devices. The pressure cells of this invention are thus completely sealed and self-contained, with no external moving parts, employing the electrical characteristics of the chamber-separating diaphragm to indicate the pressure differential between the chambers of the cell.

Other and more specific objects will be apparent from the features, elements, combinations and operating procedures disclosed in the following detailed description and shown in the drawings, in which:

FIGURE 1 is an exploded perspective cross-sectional view of the structural components positioned for assembly to form a pressure differential-sensing, dual-chamber cell incorporated in one embodiment of the present invention.

FIGURE 2 is a cross-sectional side elevation view of an assembled pressure differential sensing cell of the present invention, showing the components of FIGURE 1 in their assembled condition.

FIGURE 3 is a similar, fragmentary cross-sectional side elevation view of a modified cell in a different embodiment of the invention.

FIGURE 4 is a schematic diagram of the electrical circuit employed with the cell of FIGURES 1 and 2 in one embodiment of the invention, showing the electrical circuitry employed for accurately gaging the exact pressure differential between the two chambers of the cell as well as the additional circuitry employed to measure this gaged pressure differential with high precision.

FIGURE 5 is a diagram showing the output-frequency characteristic curve of the rejection filter circuit incorporated in the system of FIGURE 4.

Figure 7:
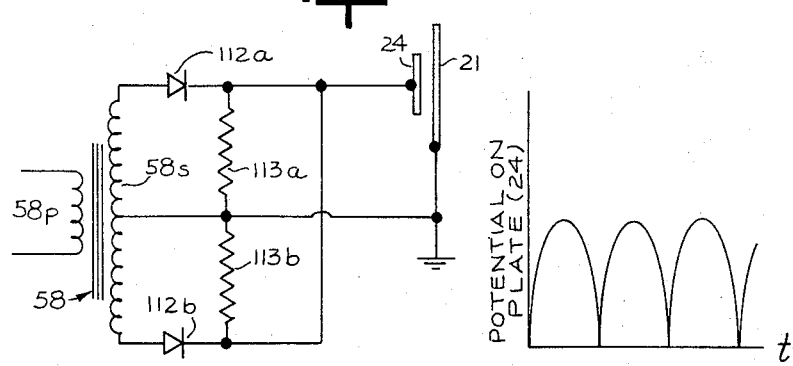
FIGURES 7 and 8 are similar fragmentary circuit diagrams showing different circuit arrangements which may be substituted for a different portion of the circuit shown in the diagram of FIGURE 4.
Figure 9:
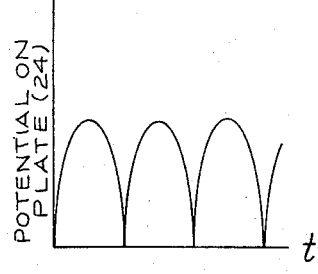
Figure 8:
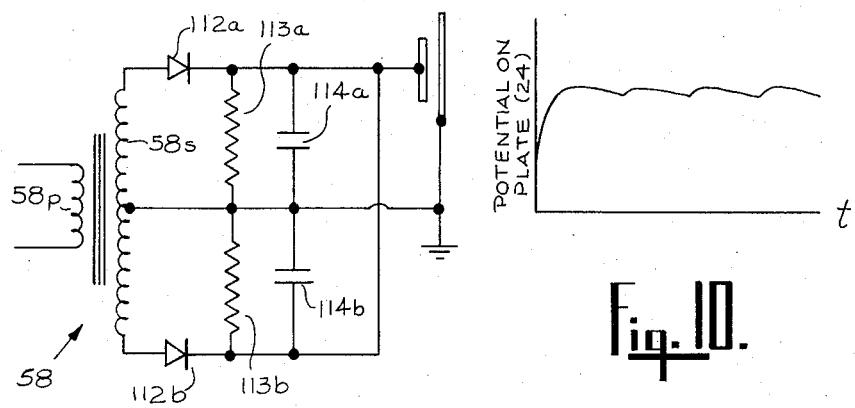
Figure 10:
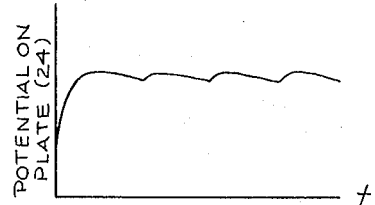

And FIGURES 9 and 10 are voltage-time diagrams showing fluctuations of the "attraction" voltage applied by the modified circuit arrangements of FIGURES 7 and 8 to the electrical connections of the pressure differential cell shown in FIGURES 1 and 2.

By harnessing and calibrating the delicate forces of electro-static attraction, highly sensitive pressure gages can be constructed which will measure differential pressures as low as $1 \times 10^{-6}$ mm. of mercury. Pressures and pressure differentials as high as 36 inches of water may be measured with the same instrument, with unusually high precision. FIGURES 1 and 2 show the components of a dual-chamber pressure differential-sensing cell incorporated in one embodiment of this invention. Sandwiched in the middle of the cell 20 is a thin flexible diaphragm 21 preferably formed of thin metallic foil stretched across the open central portion of a ring-shaped closed frame 22. Diaphragm 21 may be an integral part of the structure of frame 22, or it may be formed of metallic foil adhesively bonded to one side of the rim of frame 22.

Positioned closely adjacent to each face of diaphragm 21 are a pair of metal capacitance plates, a passive capacitance plate 23 and an active, attraction plate 24. Plates 23 and 24 are close to but not in contact with the parallel flat surfaces of diaphragm 21, as shown in FIGURE 2. The spacing of plates 23 and 24 away from the surfaces of diaphragm 21 may be maintained by peripheral ring-shaped dielectric spacers such as flat Mylar washers, or by the structural configuration of the components in their assembled condition, as shown in FIGURE 2.

Extending through each of the plates 23 and 24 in a direction away from the diaphragm 21 are respective pressure conduits 25 and 26 each communicating with the central bore of one of the elongated, threaded columns 27 and 28 joined to and extending away from the opposite faces of the plates 23 and 24.

A pressure-tight seal is formed behind each of the plates 23 and 24 by clamping them against a compressible O-ring held in place by a surrounding block of dielectric material. Thus, column 27 fits through a central aperture 29 formed in a thick dielectric block 31 having a ring-shaped groove 32 formed in a flat surface thereof facing the plate 23 and a mating O-ring 34 is positioned surrounding the column 27 between plate 23 and groove 32. When these components are assembled as shown in FIGURE 2, a clamping nut 35 threaded on the threaded column 27 secures plate 23 tightly against the O-ring 34 compressed between plate 23 and groove 32.

A protruding peripheral rim 36 extends from the block 31 completely surrounding and spaced radially from the periphery of plate 23. The rim 36 is preferably slightly thicker than the corresponding thickness of plate 23 in order to space the adjacent face of plate 23 close to but not touching the adjacent face of diaphragm 21.

A similar group of components is employed with attraction plate 24 to space its adjacent face close to but not in contact with the opposite face of diaphragm 21. Thus, column 28 is positioned to pass through a central aperture 37 formed in a dielectric block 38 similar to block 31 and also having a ring-shaped groove 39 and having a protruding rim 41 surrounding and spaced radially from the attraction plate 24 and slightly thicker than the corresponding thickness of plate 24. A compressible O-ring 42 surrounding column 28 is positioned to be sandwiched and compressed between plate 24 and block 38. These elements are assembled in telescoped relationship and the clamping nut 43 is threaded tightly down on the column 28 to hold them in their assembled relationship.

The remote faces of the two blocks 31 and 38 are clamped between cover plates 44 and 45 which are joined and clamped together by suitable assemblies of nuts, washers and bolts 46, aligned through mating holes in the periphery of the frame 22 to maintain diaphragm 21 in lateral alignment. As shown in FIGURE 1, the cover plates 44 and 45 are provided with respective recesses 47 and 48 in their inner surfaces facing the blocks 31 and 38, dimensioned to receive and mate with the outermost portions of the blocks 31 and 38 for lateral positioning of these blocks and the plates 23 and 24 clamped thereto. Thus, all components of the assembled cell shown in FIGURE 2 are laterally aligned in their desired positions, and plates 23 and 24 are positioned close to but spaced a predetermined distance away from the parallel surfaces of diaphragm 21 positioned between them.

The spacing between plates 23 and 24 and diaphragm 21 is determined by the height of rims 36 and 41 of the two dielectric spacing blocks 31 and 38. Thus, for example, if the height of rims 36 and 41 exceeds the thickness of plates 23 and 24 by an amount of 0.005 inch, the capacitance plates 23 and 24, clamped firmly to the blocks 31 and 38 by clamping nuts 35 ad 43, will be correspondingly spaced away from the normal flat position of diaphragm 21 by the same amount, 0.005 inch.

*Pressure deflection of diaphragm 21*

As shown in FIGURE 2, the assembly of the components illustrated in FIGURE 1 in their tightly clamped relationship, held in place by clamping nuts 35 and 43 and by bolts 46, produces a tightly-sealed, integral, dual-chamber cell in which a right hand reference chamber 49 is formed between the capacitance plate 23 and the diaphragm 21, communicating with the reference port formed by the pressure conduit 25 in the column 27 protruding from the right hand side of the cell 20.

A sampling chamber 51 of similar shape and configuration is formed between the attraction plate 24 and the diaphragm 21 communicating with a sampling port formed by the pressure conduit 26 in column 28 protruding from the left hand side of the cell 20. The two chambers 49 and 51 are sealed from each other by the tight clamping of the periphery of each surface of diaphragm 21 against the respective rims 36 and 41 of the dielectric blocks 31 and 38, gripping the diaphragm 21 between themselves by the action of bolts 46, and the respective chambers are further sealed by the compressed O-rings 34 and 42, likewise clamped in compression by the action of clamping nuts 35 and 43.

Pressure differentials existing between the reference chamber 49 and the sampling chamber 51 will produce bowing deflection of the diaphragm 21 toward the chamber having lower pressure. Thus, an excess pressure in sampling chamber 51 on the left side of diaphragm 21 will urge the diaphragm 21 toward capacitance plate 23, increasing the capacitance between diaphragm 21 and plate 23. Since diaphragm 21 is deflected far below the elastic and fatigue limits of the material from which diaphragm 21 is formed, its deflection is reproducibly proportional to the amount of the pressure differential. This deflection of diaphragm 21 may be counteracted, and the diaphragm 21 brought back to its central position corresponding to a zero pressure differential between chambers 49 and 51, by the application of an attracting voltage to attraction plate 24. To take advantage of these characteristics of diaphragm 21, a pair of terminal leads are connected to lock nuts threaded on the respective columns joined to the plates 23 and 24; thus as shown in FIGURE 2 a capacitance terminal 52 is joined to lock nut 53 threaded on column 27 joined to the capacitance plate 23, and an attraction terminal 54 is bonded to a lock nut 55 threaded on the threaded column 28 joined to the attraction plate 24.

The cell 20 may be conveniently mounted by being bolted to a supporting column 56 through suitable holes formed in one of the cover plates such as cover plate 44, as shown in FIGURES 1 and 2.

In the modified embodiment shown in FIGURE 3, attraction plate 24 is integrally embedded in and encapsulated by a molded dielectric block 38, leaving plate 24 exposed only via column 28 protruding from the rear face of block 38 and pressure conduit 26 passing through the front face of block 38. This front face may be machined away to reduce the encapsulating thickness of block 38 covering the front face of attraction plate 24, producing the recessed chamber 51 bounded by diaphragm 21, rim 41 and the desired remaining thickness of block 38 covering and insulating the face of attraction plate 24. A similar integral construction of capacitance plate 23 within an encapsulating molded dielectric block 31 may also be used, with resulting simplification of the assembly shown in FIGURES 1 and 2 by elimination of O-rings 34 and 42 in grooves 32 and 39, for example.

*Measuring the attraction voltage*

Since the deflection of diaphragm 21 is a direct indication of the pressure differential between the two chambers 49 and 51, the attraction voltage which must be applied to attraction plate 24 to attract and return diaphragm 21 to its central or zero position is a direct measure of this pressure differential. The application of a variable, predetermined attraction voltage to plate 24 permits the operator to vary this voltage until the diaphragm 21 is again centered in its zero position, and precise measurement of this attraction voltage provides a precise indication of the exact pressure differential to be measured.

An electrical circuit which has proved useful for these purposes is shown in the schematic diagram of FIGURE 4, where the cell 20 is shown connected to its associated circuitry for pressure measuring operation. In the left portion of FIGURE 4, AC line voltage is supplied to a calibrated adjustable voltage selector unit 57 applying an attraction voltage to attraction terminal 54 connected through column 28 to attraction plate 24 of cell 20. When this adjustable attraction plate voltage supplied to plate 24 is just sufficient to overcome the effect of any positive pressure differential in sample chamber 51 over reference chamber 49, the bowed diaphragm 21 will be re-centered in its zero position, bringing the capacitance between diaphragm 21 and the capacitance plate 23 back to its predetermined "datum" value. This center or "zero" position of diaphragm 21 may be sensitively indicated by connecting the diaphragm 21 and capacitance plate 23 as a variable capacitor in a rejection filter network 59 connected between an oscillator 61 and an amplifier 62 whose output is fed to a null indicator 63.

Rejection filter 59 has an output voltage versus frequency characteristic curve similar to that shown in FIGURE 5, with a normally low impedance and high output voltage $E_0$ for most frequencies, but a very high effective impedance produced by opposing phases in the two branch networks of filter 59, producing a very low output voltage $E_0$ for a particular selected frequency, $f_0$. One form of rejection filter network 59 providing this desirable output voltage versus characteristic curve is the bridged-T network described in Terman, Radio Engineers' Handbook (1943 edition) at page 918, or the similar "parallel-T" network described in Landee, Davis and Albrecht, Electronic Designers' Handbook (McGraw-Hill, 1957 edition) pages 16–21, through 16–25.

As shown in FIGURE 4, the preferred parallel-T rejection filter network 59 includes a first T formed by a pair of resistors 64 and 65 in series connecting the oscillator 61 with the input of amplifier 62, having a capacitor—in this case the variable capacitance of cell 20 between diaphragm 21 and capacitance plate 23—connecting the junction between the resistors to ground across the oscillator output.

In parallel with this first T is a second T formed by a series pair of capacitors 66 and 67 connected in parallel with resistors 64 and 65, having a third resistor 68 connecting the junction between the two capacitors 66 and 67 to ground across the oscillator output. This parallel-T network forming the rejection filter 59 in FIGURE 4 is a network having a moderate transmission coefficient to signals of most frequencies, but with a very low transmittance for signals of the particular frequency $f_0$ determined by the values of the circuit components, as shown in FIGURE 5.

If the oscillator 61 incorporates a similar parallel-T network of components closely matching in their electrical values the characteristics of the components of the parallel-T network forming the rejection filter 59, the precision of the entire system is greatly enhanced since fluctuations in electrical characteristics of components and networks occurring with variations in ambient temperatures are automatically compensated. Thus, when a particular temperature change produces a shift in $f_0$ for the oscillator 61, it produces the same shift in $f_0$ for the rejection filter 59. If the foregoing first approximation temperature compensation effect is inexact, it may be perfected by adjusting trimmer capacitors or similar adjustable components (not shown) in one or both of the parallel-T networks of filter 59 and oscillator 61.

In the second parallel-T network forming oscillator 61, the first T is formed by resistors 69 and 71 connected in series with their junction being connected to a first terminal of capacitor 72, while the second branch T is formed by capacitors 73 and 74 in series, with their junction connected to a first terminal of resistor 75. The opposite or second terminals of capacitor 72 and resistor 75 are both connected to ground. This second parallel-T network incorporating these components has its first T branch connected between the base and the collector of an N-P-N transistor 76 whose emitter is connected through a standard R-C biasing circuit 77 to the common ground.

The following Table I shows the values adopted in one embodiment of the present invention for the various circuit components of the two parallel-T networks, and the last column of this table gives algebraic statements of the values of the various circuit components as functions of the values of resistor 64 and capacitor 66:

TABLE I

| Component | Rej. Filter | Oscillator | Value | Symbol |
|---|---|---|---|---|
| Resistor | 64 | 69 | 5K | R |
| Do | 65 | 71 | 5K | kR |
| Capacitor | Cell 20 | 72 | 100 pf | C/b |
| Do | 66 | 73 | 100 pf | C |
| Do | 67 | 74 | 100 pf | C/b |
| Resistor | 68 | 75 | 5K | bR |

In the foregoing table the values $k$ and $b$ are simply constants which may be adjusted to produce maximum feedback in the oscillator circuit 61. These constants are selected so that $$b = \frac{0.414k}{(k+1)}$$

and $$RC = \frac{1}{\omega_0}$$

I have found that values of $k$ exceeding 100 produce no noticeable reduction in the attenuation band width as reflected by the Q of the resonant negative peak in the voltage-frequency response curve C illustrated in FIGURE 5.

The parameters and characteristics of such bridged-T or parallel-T networks are summarized in Landee, Davis and Albrecht, Electronic Designers' Handbook (McGraw-Hill, 1957 edition) pages 16–21 through 16–25. An alternative form of oscillator 61 employing additional transistors and oscillator networks may be employed if desired, but the parallel-T single transistor oscillator 61 shown in FIGURE 4 has been found entirely satisfactory for most purposes.

*Oscillator power supply*

A first transformer 78 connected across the AC line powers a first full-wave rectifier circuit 79 supplying DC to a series array of four resistors 81, 82, 83 and 84 leading to ground. A Zener diode 85 connected in parallel with resistors 83 and 84 regulates the DC potential of the junction between resistors 82 and 83, connected to a reference terminal 86. Accordingly, the junction 87 between resistors 83 and 84 provides a regulated source of lower DC potential, of −20 v. (B−) for example, connected through a transformer 60 to the oscillator parallel-T network 61.

*Attracting voltage adjusting circuitry*

As shown in FIGURE 4, a selected amount of conventional AC line voltage is taken from the tap of a variable resistor 88 and applied to the primary of a second transformer 89 whose secondary operates a second full-wave rectifier 91 supplying DC potential across a voltage divider array 57. The array 57 comprises a series string of resistors 92–101 having resistance values selected to provide a series of voltage steps corresponding generally to a "square-law" response curve, to produce substantially equal increments of attractive deflection of diaphragm 21, with each shift of a variable selector rheostat 102 to a new pair of junction terminals between successive resistors 92–101.

The following Table II shows the values for resistors 92–101 in one embodiment of the invention:

TABLE II

| Resistor: | Value, ohms |
|---|---|
| 92 | 4.7K |
| 93 | 4.7K |
| 94 | 10K |
| 95 | 10K |
| 96 | 15K |
| 97 | 15K |
| 98 | 22K |
| 99 | 22K |
| 100 | 22K |
| 101 | 49K |

As shown in FIGURE 4, the junction points between each successive pair of resistors 92–101 form equidistantly spaced pairs of voltage selector terminals, and any such pair may be connected by the terminal taps of the variable selector rheostat 102, whose variable tap forms a vernier or "fine" adjustment voltage selector providing a selected DC voltage to attraction terminal 54, for precise attraction of diaphragm 21 toward its "zero" or "datum" position.

*Null indicator*

The Zener diode 85 performs a dual function. It governs the DC voltage at junction 87, supplying constant DC potential to oscillator 61. In addition, it also provides a fixed DC potential at terminal 86 which can be matched with the DC potential at the junction between resistors 100 and 101 connected to a terminal 103 of null indicator switch 104.

In the left position of the double-pole double-throw switch 104, null indicator 63 is connected to match these voltages, and variable resistor 88 may then be adjusted until a null on indicator 63 confirms the calibrated setting of the voltage divider 57.

Null indicator 63 also serves to identify the specific adjusted position of voltage divider array 57 and vernier rheostat 102 supplying the attraction voltage to plate 24 which is just sufficient to return diaphragm 21 to its "datum" position, counterbalancing the pressure differential between chambers 49 and 51. This function of indicator 63 is produced in the right position of null indicator switch 104, connecting null indicator 63 across the output terminals 105 and 106 of amplifier 62, where the output voltage $E_o$ shown in FIGURE 5 is measured.

*Operation*

In the embodiment of the invention illustrated in FIGURE 4, incorporating the dual-chamber cell 20 of FIGURES 1 and 2, the "zero" or undeflected "datum" position of diaphragm 21 occurs when the pressures in sample chamber 49 and reference chamber 51 are equal. The capacitance between diaphragm 21 and capacitance plate 23 produces the low output voltage shown in FIGURE 5 for a particular $f_0$ for which oscillator 61 is tuned to resonance.

While diaphragm 21 remains in its undeflected position, indicator 63 shows a minimum or "null" output signal from amplifier 62.

In the centered, datum position of diaphragm 21 for which rejection filter network 59 is tuned, $E_o$ is preferably zero, as shown in FIGURE 5. Any pressure differential deflecting diaphragm 21 detunes network 59, changing the characteristic output voltage-frequency curve of rejection filter network 59 from line C to line D in FIGURE 5, producing a high output voltage $E_1$ because oscillator 61 continues to supply a signal at the resonant frequency $f_0$.

The pressure to be measured and the reference pressure are next respectively introduced into chamber 49 and chamber 51 by suitable conduits and manual or automatic control valves not shown in the drawings. The higher of these two pressures is introduced into sample chamber 51, deflecting diaphragm 21 elastically toward capacitance plate 23, changing the capacitance between components 21 and 23 to detune rejection filter 59. As a result, the resonant frequency of maximum effective rejection is shifted to a new value, $f_1$ (FIGURE 5), with a new output voltage frequency characteristic curve D having a higher value of transmittance for signals at the former resonant frequency $f_0$. Since the output of oscillator 61 is still at the original resonant frequency $f_0$, null indicator 63 shows an increase in the amplitude of the output voltage $E_o$ of amplifier 62, varying as a function of the deflection of diaphragm 21.

The DC voltage applied to attraction plate 24 is now gradually increased until electrostatic attraction restores diaphragm 21 to its "zero" position, producing a null on indicator 63 by reversing the foregoing "detuning."

By adjusting array 57 and vernier rheostat 102 while switch 104 is in its right position, the $E_o$ curve of amplifier 62 can be restored to line C as shown by a null on indicator 63.

The pressure differential in cell 20 is then indicated by the calibrated setting of 57 and 102, and their calibration may be refined and confirmed by adjusting variable resistor 88 while switch 104 is in its left position until the DC potential at terminal 103 is matched with the Zener controlled potential at terminal 86, as shown by a null on indicator 63.

Figure 6:
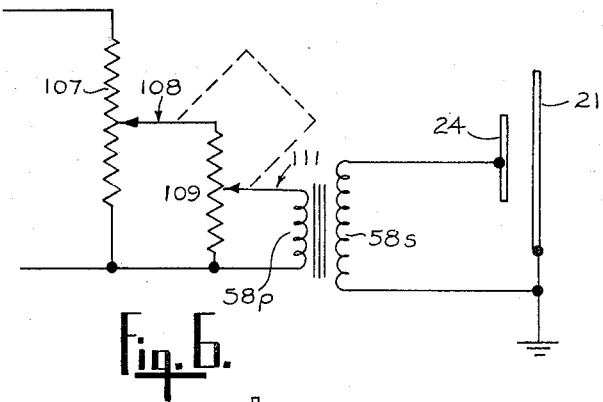
FIGURE 6 is a fragmentary schematic circuit diagram showing a variation which may be substituted for a portion of the circuit diagram in FIGURE 4.

An alternative form of voltage selector network, differing from that shown at the left hand side of FIGURE 4, which may be employed to vary the attraction voltage on plate 24 is shown in FIGURE 6. This alternative network takes advantage of the fact that the relationship between each pressure differential $p$ (in mm. of mercury) in the two chambers of cell 20 and the particular attraction voltage (in volts) required to counteract that pressure differential can be stated for one particular embodiment of cell 20 by the general expression $$p = GV^2 \text{ where}$$

$$G = \frac{C}{2AD}$$

in which C is the capacitance of the cell 20 expressed in farads, A is the effective area of attraction plate 24 in in.$^2$, and D is the distance between plate 24 and diaphragm 21 in inches. For one embodiment of the invention, $C = 10^{-12}$ farads, and for this embodiment $p = (12.4 \times 10^{-4})V^2$. The square-law relationship between $p$ and V requires a substantial attraction voltage on plate 24 to begin to compensate for a given pressure differential, and subsequent increments of attraction voltage have successively more effect in restoring diaphragm 21 to its centered or "zero" datum position. By employing a pair of variable resistors in parallel, as shown in FIGURE 6, the operator can approximate an attraction voltage on plate 24 increasing substantially in proportion to the square of the increments of linear adjustment of the parallel taps of the resistors. Thus, instead of resistors 57 and 102, in FIGURE 6 the line voltage is applied across a first variable resistor 107 which is provided with a variable tap 108 leading to one terminal of a second variable resistor 109 whose opposite terminal is connected to that of resistor 107 and to the opposite side of the line. The variable tap 111 on resistor 109 is connected to one end of primary winding 58p of a transformer 58, the other end of which is connected to the opposite end of variable resistor 109. Secondary winding 58s connects attraction plate 24 and grounded diaphragm 21 in cell 20, applying an AC attraction voltage to restore diaphragm 21 to its datum position.

The two taps 108 and 111 of the two variable resistors 107 and 109 are ganged together for simultaneous movement. For example, if resistor 107 has a value of 1.5K ohms and resistor 109 has a value 5K ohms, and if the impedance of primary winding 58p is 15K ohms, adjustment of taps 108 and 111 to select increasingly larger portions of the two variable resistances 107 and 109 will produce an attraction voltage at plate 24 increasing by an excellent first approximation of a square-law relationship as a function of the percentage of the two variable resistors' overall resistance tapped by the two variable taps.

While the voltage produced at a secondary winding 58s of transformer 58 is normally an AC voltage which is applied to attraction plate 24 and diaphragm 21, the opposite polarity of plate 24 and diaphragm 21 produces a pulsing electrostatic attraction potential between these two elements proportional to the root mean square value of the AC signal developed across the transformer secondary winding 58s. The use of this RMS value leaves about 30 percent of the permissible peak voltage range unused, however, and rectified DC produced by the secondary winding circuits of FIGURES 7 and 8 will use much greater proportions of the permissible peak voltage range, which is limited only by the capacitive dielectric strength of the cell 20. Thus, in FIGURE 7 the secondary winding 58s incorporates a full-wave rectifier including diodes 112a and 112b. The voltage developed across the resistors 113a and 113b is represented by the pulsing DC voltage shown in FIGURE 9, and is applied directly to the attraction plate 24. In the modified secondary circuit shown in FIGURE 8 a similar full-wave rectifier circuit is connected through resistors 113a and 113b with respective capacitors 114a and 114b in parallel, and the resulting voltage developed across the resistor and capacitor pairs is represented by the rippling DC voltage shown in FIGURE 10. AC voltage reversals, DC pulses or rippling DC voltages will all produce desirable "dither" of the diaphragm 21 tending to move it past any "hysteresis" sluggishness, thus facilitating the desired restoration of diaphragm 21 to its centered zero position through the action of the attraction plate 24.

The dual-chamber cells 20 of this invention, as shown in FIGURES 1, 2 and 3, achieve pressure-differential sensing without using any movable parts except the completely enclosed, flexing diaphragm 21, deflecting well within its elastic limit. No expansion chambers, linkages or mechanisms are employed, and cell 20 may be fabricated in extermely small sizes. By employing integrated circuits or solid state components in the circuitry of FIGURES 4-8, highly miniaturized pressure-gaging systems are achieved offering high precision, great sensitivity, and automatic temperature compensation.

While the objects of the invention are efficiently achieved by the preferred forms of the invention described in the foregoing specification, the invention also includes changes and variations falling within and between the definitions of the following claims.

I claim:

1. A pressure-gaging system comprising in combination:
   (A) a dual-chamber gage cell having a rim-anchored thin flexible conductive diaphragm positioned between and separating from each other
      a sample chamber positioned between the diaphragm and a conductive sensing-plate
      and an opposite reference chamber positioned between the diaphragm and a conductive attraction plate,
      with the diaphragm and both plates electrically insulated from each other,
   (B) conduit means respectively connecting the sample and reference chambers to separate sources of sample and reference pressures to be compared;
   (C) indicating circuit means responsive to changes in the electrical relationship between the diaphragm and the sensing plate caused by pressure-differential-actuated flexing deflection of the diaphragm,
   (D) and adjustable means supplying a variable preselected attraction voltage to the attraction plate to counteract the flexing deflection of the diaphragm.

2. The system defined in claim 1 wherein the circuit means facilitates selection of the variable attraction voltage by exhibiting a high-Q indication of tuned circuit resonance corresponding to a datum position taken by the diaphragm when the pressures in both chambers are equal.

3. The system defined in claim 2 wherein the circuit means includes a resonant oscillator with an output frequency $f_0$ connected to a tuned rejection filter network producing a null minimum output voltage at the frequency $f_0$ and incorporating the diaphragm and the sensing plate therein in a manner affording automatic detuning of the tuned rejection filter network in response to pressure-differential-actuated deflection of the diaphragm.

4. The system defined in claim 3 wherein the rejection filter network comprises a parallel-T network.

5. The system defined in claim 3 wherein both the oscillator and the rejection filter network comprise similar parallel-T networks with substantially corresponding component values, whereby ambient temperature variations produce counteracting self-compensating effects in the oscillator and in the rejection filter network.

6. The system defined in claim 1 wherein the circuit means includes a first rectifier supplying direct current to a first voltage divider having an intermediate terminal connected to a voltage regulating component minimizing variations in the voltage drop across a selected portion of the voltage divider.

7. The system defined in claim 6 wherein the regulated voltage across a selected portion of the voltage divider is supplied to other components of the circuit means.

8. The system defined in claim 6 wherein the regulated voltage across a selected portion of the first voltage divider is connected to a matching terminal, and wherein a second rectifier supplies direct current to a first variable resistance connected to supply the variable preselected attraction voltage to the attraction plate with means for matching the regulated voltage at the intermediate terminal with the voltage drop over a predetermined part of the first variable resistance.

9. The system defined in claim 8 wherein the matching means includes a second variable resistance adjustable to produce a null reading on a null indicator connected to the intermediate terminal and the predetermined part of the first variable resistance.

10. The system defined in claim 9 wherein the null indicator may be switched to measure the output of a tuned network in the indicating circuit means.

References Cited

UNITED STATES PATENTS 3,249,833   5/1966   Vosteen _____ 317—246

LOUIS R. PRINCE, *Primary Examiner.*

D. O. WOODIEL, *Assistant Examiner.*